(12) United States Patent
Zhuo et al.

(10) Patent No.: US 11,113,272 B2
(45) Date of Patent: *Sep. 7, 2021

(54) METHOD AND APPARATUS FOR STORING BLOCKCHAIN STATE DATA AND ELECTRONIC DEVICE

(71) Applicant: Advanced New Technologies Co., Ltd., Grand Cayman (KY)

(72) Inventors: Haizhen Zhuo, Hangzhou (CN); Zhonghao Lu, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,155

(22) Filed: Jan. 28, 2020

(65) Prior Publication Data

US 2020/0167345 A1    May 28, 2020

Related U.S. Application Data

(63) Continuation of application No. PCT/CN2020/072122, filed on Jan. 15, 2020.

(30) Foreign Application Priority Data

Jul. 31, 2019  (CN) .......................... 201910703788.5

(51) Int. Cl.
*G06F 16/23* (2019.01)
*G06F 16/22* (2019.01)
(Continued)

(52) U.S. Cl.
CPC ...... *G06F 16/2379* (2019.01); *G06F 16/2246* (2019.01); *G06Q 20/065* (2013.01);
(Continued)

(58) Field of Classification Search
CPC .. G06F 16/2379; G06F 16/2246; G06F 16/27; G06Q 20/388; G06Q 20/382; G06Q 20/065; G06Q 20/229
See application file for complete search history.

(56) References Cited

U.S. PATENT DOCUMENTS

| 8,972,986 B2 | 3/2015 | Palanisamy et al. |
| 9,514,188 B2 | 12/2016 | Cohen et al. |

(Continued)

FOREIGN PATENT DOCUMENTS

| CN | 107145605 | 9/2017 |
| CN | 108197226 | 6/2018 |

(Continued)

OTHER PUBLICATIONS

PCT International Search Report and Written Opinion in International Application No. PCT/CN2020/072122, dated Apr. 26, 2020, 15 pages (with partial machine translation).

(Continued)

*Primary Examiner* — Mariela Reyes
*Assistant Examiner* — Fatima P Mina
(74) *Attorney, Agent, or Firm* — Fish & Richardson P.C.

(57) ABSTRACT

A method of storing blockchain state data, including: after execution of a transaction in a target block is completed, based on a latest account state of a target account related to the transaction in the target block after update, generating updated data nodes corresponding to the current Merkle state tree of the target block and, based on generated historical data nodes and data nodes other than the reused data nodes corresponding to the target account on the historical Merkle state tree of the previous block of the target block, creating the historical Merkle state tree for the target block.

22 Claims, 5 Drawing Sheets

(51) Int. Cl.
    *G06Q 20/38*     (2012.01)
    *G06Q 20/06*     (2012.01)
    *G06Q 20/22*     (2012.01)

(52) U.S. Cl.
    CPC ......... *G06Q 20/229* (2020.05); *G06Q 20/382* (2013.01); *G06Q 20/388* (2013.01)

(56) References Cited

U.S. PATENT DOCUMENTS

| | | | |
|---|---|---|---|
| 10,103,893 | B2 | 10/2018 | Kroonmaa et al. |
| 2002/0064311 | A1* | 5/2002 | Yahagi ............... G06F 3/018 382/224 |
| 2010/0235335 | A1 | 9/2010 | Heman et al. |
| 2012/0209822 | A1 | 8/2012 | Prabhakar et al. |
| 2016/0110261 | A1 | 4/2016 | Parab et al. |
| 2016/0191243 | A1 | 6/2016 | Manning |
| 2016/0275201 | A1* | 9/2016 | Li ...................... G06F 16/221 |
| 2016/0344737 | A1* | 11/2016 | Anton ................ G06F 21/6218 |
| 2017/0236120 | A1* | 8/2017 | Herlihy ............... G06F 21/57 705/67 |
| 2017/0262638 | A1* | 9/2017 | Horowitz ............. G06F 9/54 |
| 2017/0344435 | A1 | 11/2017 | Davis |
| 2017/0345011 | A1 | 11/2017 | Salami et al. |
| 2018/0198626 | A1 | 7/2018 | Kroonmaa et al. |
| 2020/0117690 | A1* | 4/2020 | Tran ................... G06F 16/9536 |
| 2020/0167367 | A1 | 5/2020 | Zhuo et al. |

FOREIGN PATENT DOCUMENTS

| | | |
|---|---|---|
| CN | 108230109 | 6/2018 |
| CN | 108282474 | 7/2018 |
| CN | 108615156 | 10/2018 |
| CN | 108923932 | 11/2018 |
| CN | 109359222 | 2/2019 |
| CN | 109408521 | 3/2019 |
| CN | 109586934 | 4/2019 |
| CN | 109857810 | 6/2019 |
| CN | 109933592 | 6/2019 |
| CN | 109992998 | 7/2019 |
| CN | 110457319 | 11/2019 |
| CN | 110493325 | 11/2019 |
| WO | WO 2019101229 | 5/2019 |

OTHER PUBLICATIONS

PCT International Search Report and Written Opinion in International Application No. PCT/CN2020/072123, dated Apr. 24, 2020, 13 pages (with partial machine translation).

Tan, "Research and Implementation of Networking Log Management and Analysis Technology," China Master's Theses Full-text Database Information Technology, Oct. 2015, 68 pages (with machine translation).

You et al., "Hybrid Indexing Scheme Supporting Blockchain Transaction Tracing," Computer Integrated Manufacturing Systems, Apr. 2019, 25(4):976-984 (with English abstract).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Bencic et al., "Distributed Ledger Technology: Blockchain Compared to Directed Acyclic Graph," 2018 IEEE 38th International Conference on Distributed Computing Systems (ICDCS), Apr. 2018, 6 pages.

* cited by examiner

302 — After execution of a transaction in a target block is completed, based on a latest account state of a target account related to the transaction in the target block after update, generate updated data nodes corresponding to the current Merkle state tree of the target block and, based on a historical account state of the target account before the update, generate history data nodes corresponding to the historical Merkle state tree of the target block 304 — Based on the generated updated data nodes, modify and update data nodes corresponding to the target account on the current Merkle state tree of the previous block of the target block, to obtain the current Merkle state tree of the target block 306 — Based on the generated historical data nodes and data nodes other than the reused data nodes corresponding to the target account on the historical Merkle state tree of the previous block of the target block, create the historical Merkle state tree for the target block

FIG. 3

METHOD AND APPARATUS FOR STORING BLOCKCHAIN STATE DATA AND ELECTRONIC DEVICE

CROSS-REFERENCE TO RELATED APPLICATIONS

This application is a continuation of PCT Application No. PCT/CN2020/072122, filed on Jan. 15, 2020, which claims priority to Chinese Patent Application No. 201910703788.5, filed on Jul. 31, 2019, and each application is hereby incorporated by reference in its entirety.

TECHNICAL FIELD

One or more implementations of the present specification relate to the technical field of blockchain, and in particular, to a method and an apparatus for storing blockchain state data, and an electronic device.

BACKGROUND

Blockchain technology, also known as distributed ledger technology, is an emerging technology in which several computing devices participate in "record-keeping" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present specification provides a method of storing blockchain state data, wherein account state data in the blockchain is organized into a Merkle state tree and stored in a database; the Merkle state tree includes a current Merkle state tree formed by a latest account state of each blockchain account; and a historical Merkle state tree formed by a historical account state of each blockchain account; and the method includes the following: after execution of a transaction in a target block is completed, based on an updated latest account state of a target account related to the transaction in the target block, generating updated data nodes corresponding to the current Merkle state tree of the target block and, based on a historical account state of the target account before the update, generating historical data nodes corresponding to the historical Merkle state tree of the target block; based on the generated updated data nodes, modifying and updating data nodes corresponding to the target account which are on the current Merkle state tree of the previous block of the target block, to obtain the current Merkle state tree of the target block; based on the generated historical data nodes and data nodes other than the reused data nodes corresponding to the target account on the historical Merkle state tree of the previous block of the target block, creating the historical Merkle state tree for the target block.

Optionally, the data nodes on the current Merkle state tree are organized into a data structure of a B+ tree, and stored in the database; and the data nodes on the historical Merkle state tree are organized into a data structure of an LSM tree, and stored in the database.

Optionally, the database is a Key-Value database; and the data nodes on the Merkle state tree are stored in the database in the form of Key-Value pairs; wherein a key of a data node on the current Merkle state tree is a node ID of the data node; and a key of a data node on the historical Merkle state tree is a hash value of data content contained in the data node.

Optionally, the database is a LevelDB database; or a database based on a LevelDB architecture.

Optionally, the database is a Rocksdb database based on the LevelDB architecture.

Optionally, the Merkle tree is a variant of a Merkle tree with a tree structure incorporating a Trie dictionary tree.

Optionally, the Merkle state tree is a Merkle Patricia Tree state tree.

The present specification also provides an apparatus for storing blockchain state data, wherein account state data in the blockchain is organized into a Merkle state tree and stored in a database; the Merkle state tree includes a current Merkle state tree formed by a latest account state of each blockchain account; and a historical Merkle state tree formed by a historical account state of each blockchain account; and the apparatus includes the following: a generation module, configured to: after execution of a transaction in a target block is completed, based on a latest account state of a target account related to the transaction in the target block after the update, generate updated data nodes corresponding to the current Merkle state tree of the target block and, based on a historical account state of the target account before the update, generate historical data nodes corresponding to the historical Merkle state tree of the target block; a modification module, configured to: based on the generated updated data nodes, modify and updated data nodes corresponding to the target account on the current Merkle state tree of the previous block of the target block, to obtain the current Merkle state tree of the target block; and a creation module, configured to: based on the generated historical data nodes and data nodes other than the reused data nodes corresponding to the target account on the historical Merkle state tree of the previous block of the target block, create the historical Merkle state tree for the target block.

Optionally, the data nodes on the current Merkle state tree are organized into a data structure of a B+ tree, and stored in the database; and the data nodes on the historical Merkle state tree are organized into a data structure of an LSM tree, and stored in the database.

Optionally, the database is a Key-Value database; and the data nodes on the Merkle state tree are stored in the database in the form of Key-Value pairs; wherein a key of a data node on the current Merkle state tree is a node ID of the data node; and a key of a data node on the historical Merkle state tree is a hash value of data content contained in the data node.

Optionally, the database is a LevelDB database, or a database based on a LevelDB architecture.

Optionally, the database is a Rocksdb database based on the LevelDB architecture.

Optionally, the Merkle tree is a variant of the Merkle tree with a tree structure incorporating a Trie dictionary tree.

Optionally, the Merkle state tree is a Merkle Patricia Tree state tree.

In the above technical solution, on the one hand, since there is no data node reusing relationship between the current Merkle state tree and the historical Merkle state tree, the current Merkle state tree only maintains the latest account state of each blockchain account, and the historical Merkle state tree only maintains the historical account state of each blockchain account, when searching for the latest account state of each blockchain account it only needs to traverse the current Merkle state tree of the previous block to find the latest account state after execution of the transaction of the account is completed in the previous block, which can improve the access performance of the Merkle state tree.

On the other hand, the amount of data in the historical Merkle state tree is prone to increase rapidly, data migration and hierarchical storage are often needed, therefore, the Merkle state tree formed by the account state data in the blockchain is designed into a double tree structure of a current Merkle state tree and a historical Merkle state tree, which is more conducive to data migration and hierarchical storage.

BRIEF DESCRIPTION OF THE DRAWINGS

FIG. 3 is a flowchart illustrating a method of storing blockchain state data, according to an example of an implementation;

DETAILED DESCRIPTION OF THE EXAMPLES

Figure 1:
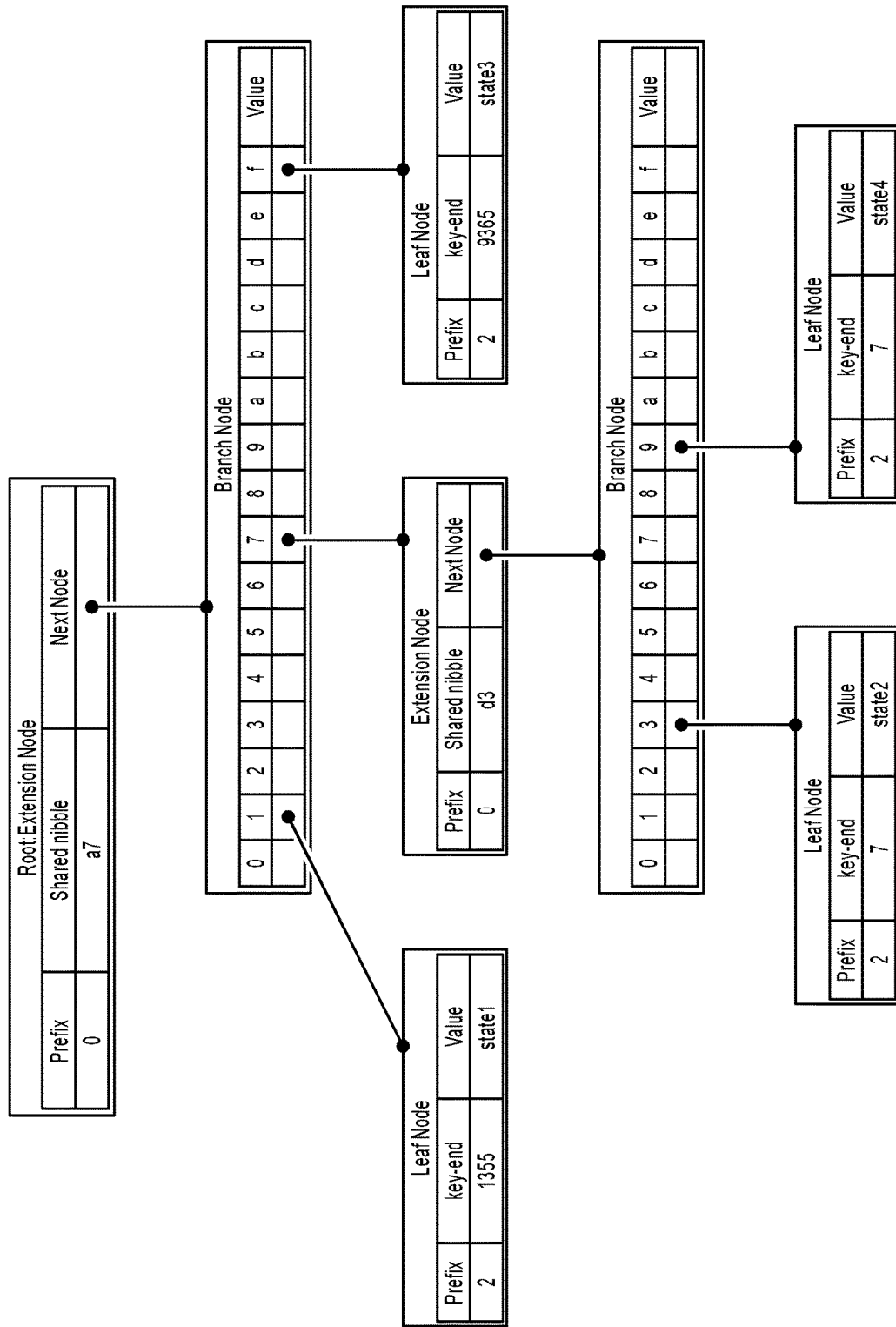
FIG. 1 is a schematic diagram illustrating organizing account state data of a blockchain into an MPT state tree, according to an example of an implementation.

Example of an implementation will be described in detail here, examples of which are illustrated in the accompanying drawings. When the following description refers to the accompanying drawings, the same numerals in different drawings represent the same or similar elements unless otherwise indicated. The implementations described in the following example of an implementations do not represent all implementations consistent with one or more implementations of the present specification. Rather, they are merely examples of apparatuses and methods consistent with some aspects of one or more implementations of the present specification, as detailed in the appended claims.

It should be noted that, in other implementations, the steps of the corresponding method are not necessarily performed in the order shown and described in the present specification. In some other implementations, the method can include more or fewer steps than described in the present specification. In addition, a single step described in the present specification can be divided into multiple steps for description in other implementations; and multiple steps described in the present specification can be combined into a single step for other implementations.

Blockchains are generally divided into three types: public blockchain, private blockchain, and consortium blockchain. In addition, there can be combinations of the above types, such as private blockchain+consortium blockchain, consortium blockchain+public blockchain, etc.

Here, the most decentralized is the public blockchain. The public blockchain is represented by Bitcoin and Ethereum. Participants (also known as nodes in the blockchain) joining the public blockchain can read data records on the chain, participate in transactions, and compete for the record-keeping right for latest blocks. Moreover, each node can freely join or leave the network and perform related operations.

On the contrary, for the private blockchain, the write permission of the network is controlled by an organization or institution, and the data read permission is regulated by the organization. In simple terms, a private blockchain can be a weakly centralized system with strict restrictions on nodes and having a small number of nodes. This type of blockchain is more suitable for internal use by specific institutions.

The consortium blockchain is a blockchain between the public blockchain and the private blockchain, which can achieve "partial decentralization". Each node in the consortium blockchain usually has a corresponding entity or organization; nodes are authorized to join the network and form a stakeholder alliance to jointly maintain the operation of the blockchain.

Based on the basic characteristics of a blockchain, a blockchain is usually composed of several blocks. In each of these blocks, a timestamp corresponding to the creation time of the block is recorded, and all of the blocks form a time-ordered data chain strictly based on the timestamps recorded in the blocks.

The real data generated by the physical world can be constructed into a standard transaction format supported by the blockchain, and then post to the blockchain, and the node devices in the blockchain will perform consensus processing on the received transactions. After reaching a consensus, the transaction will be packaged into a block by the node device that acts as a record-keeping node in the blockchain, and are stored persistently as a credential in the blockchain.

The consensus algorithms supported in the blockchain can include the following types:

a first type of consensus algorithm, that is, a consensus algorithm in which the node devices have to compete for the record-keeping right of each round of record-keeping cycle; for example, consensus algorithms such as Proof of Work (POW), Proof of Stake (POS), appointment Consensus algorithms such as Delegated Proof of Stake (DPOS); and a second type of consensus algorithm, that is, a consensus algorithm that a record-keeping node is elected in advance for each round of record-keeping cycle (without the need to compete for the record-keeping right); for example, consensus algorithms such as Practical Byzantine Fault Tolerance (PBFT).

In a blockchain network applying the first type of consensus algorithm, node devices that compete for the record-keeping right can execute a transaction upon receiving the transaction. One of the node devices competing for the record-keeping right can win in the current round of contention for the record-keeping right and become the record-keeping node. The record-keeping node can package the received transaction with other transactions to generate the latest block, and send the generated latest block or the block header of the latest block to other node devices for consensus.

In the blockchain network applying the second type of consensus algorithm, the node device having the record-keeping right has been agreed before the current round of record-keeping. Therefore, upon receiving a transaction, a node device, if the node device is not the record-keeping node of the current round, can send the transaction to the record-keeping node. The record-keeping node of the current round can execute the transaction during or before the transaction is packaged with other transactions to generate the latest block. After the record-keeping node generates the latest block, the record-keeping node can send the latest block or the block header of the latest block to other node devices for consensus.

As previously described, no matter which consensus algorithm is adopted by the blockchain, the record-keeping node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the record-keeping process of the blockchain. The other nodes can also execute the transaction contained in the block during the process of verifying the latest block or block header sent by the record-keeping node.

In the field of blockchain technology, there is an important concept: account. Taking Ethereum as an example, accounts are divided into two types: external accounts and contract accounts. An external account is an account directly controlled by a user, also referred to as a user account; and a contract account is an account containing contract codes (that is, smart contracts) which is created by a user through an external account.

For some blockchain models (such as the blockchain provided by ANT FINANCIAL) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain the current account balance of the account.

The Nonce field is configured to maintain the number of transactions for this account; and it is a counter used to ensure that each transaction can be processed only once, effectively avoiding replay attacks.

The Code field is configured to maintain the contract codes of the account. In actual application, the Code field usually only maintains the hash value of the contract codes; therefore, the Code field is also commonly called the Codehash field.

The Storage field is configured to maintain the storage content of the account (the field value is null by default). For a contract account, an independent storage space is usually allocated to store the storage content of the contract account; and the independent storage space is usually referred to as the account storage of the contract account. The storage content of the contract account is usually constructed as a data structure of an MPT (Merkle Patricia Trie) tree and stored in the above independent storage space. Here, the MPT tree constructed based on the storage content of the contract account is also commonly referred to as a Storage tree. The Storage field usually only maintains the root node of the Storage tree; therefore, the Storage field is also commonly called the StorageRoot field.

For an external account, the field values of the Code field and the Storage field are both nulls.

For most blockchain models, Merkle trees are usually used; or, data structures based on Merkle trees are used to store and maintain data. Take Ethereum as an example. Ethereum uses the MPT tree (a variant of Merkle tree) as a data organization form to organize and manage important data such as account states and transaction information.

For data that needs to be stored and maintained in the blockchain, Ethereum designed three MPT trees, which are MPT state tree, MPT transaction tree, and MPT receipt tree. In addition to the above three MPT trees, there is actually a Storage tree constructed based on the storage content of the contract account.

The MPT state tree is an MPT tree formed by the account state data of all accounts in the blockchain. The MPT transaction tree is an MPT tree formed by transaction data in the blockchain. The MPT receipt tree is an MPT tree formed by transaction receipts corresponding to the transactions in the block respectively, wherein each transaction receipt is generated after the execution of the corresponding transaction in the block is completed. The hash values of the root nodes of the MPT state tree, the MPT transaction tree, and the MPT receipt tree are eventually added to the block header of the corresponding block.

The MPT transaction tree and the MPT receipt tree correspond to blocks, that is, each block has its own MPT transaction tree and MPT receipt tree. The MPT state tree is a global MPT tree, which does not correspond to a specific block, but covers the account state data of all accounts in the blockchain.

The organized MPT transaction tree, MPT receipt tree, and MPT state tree are eventually stored in a Key-Value database (such as LevelDB) that adopting a multi-level data storage structure.

The database adopting a multi-level data storage structure usually adopts a multi-level data storage structure and can be divided into n-level data storages. For example, the data storage at each level can be set to L0, L1, L2, L3, L (n−1) in that order; for each level of data storage in the above database, the smaller the level number is, the higher the level is. For example, L0 stores the latest data of several blocks, and L1 stores the second latest data of several blocks, and so on.

Here, the reading and writing performance of the storage medium corresponding to the data storage at each level can also have performance differences. For example, the reading and writing performance of the storage medium corresponding to a high-level (that is, with a small level number) data storage can be higher than the reading and writing performance of the storage medium corresponding to a low-level (that is, with a large level number) data storage. In actual application, high-level data storage can use storage medium with higher storage cost and better storage performance; while lower-level data storage can use storage medium with lower unit cost and larger capacity.

In actual application, as the block number (also known as the block height) of the blockchain increases, the data stored in the database will contain a lot of historical data. Moreover, the smaller the block number is, the older the data in the block is and the less important the data is. Therefore, in order to reduce the overall storage cost, data of different block heights can usually be treated differently. For example, data in blocks with smaller block numbers can be stored on lower-cost storage media; data in blocks with larger block numbers can be stored higher-cost storage media.

It should be noted that for each latest block generated by the blockchain, after the transactions in the latest block are executed, states of the relevant accounts (either external accounts or contract accounts) of these executed transactions in the blockchain usually changes with them.

For example, after execution of a "transfer transaction" in the block is completed, the balances (that is, the value of the Balance field of these accounts) of the sending account and the receiving account related to the "transfer transaction" usually also change with it.

After execution of the transaction of the node device in the latest block generated by the blockchain is completed, since the account state in the current blockchain has changed, the node device needs to build an MPT state tree based on the current account state data of all accounts in the blockchain, to maintain the latest states of all accounts in the blockchain.

That is, whenever a latest block is generated in the blockchain, execution of the transaction in the latest block is completed, and the account states in the blockchain change, the node device needs to rebuild an MPT state tree based on the latest account state data of all accounts in the blockchain.

In other words, each block in the blockchain has a corresponding MPT state tree; the MPT state tree maintains the latest account states of all the accounts in the blockchain after execution of the transactions in the block is completed.

Referring to FIG. 1, which is a schematic diagram of organizing account state data of a blockchain into an MPT state tree.

An MPT tree is an improved Merkle tree variant, which combines advantages of Merkle tree and Trie dictionary tree (also called prefix tree).

There are usually three types of data nodes in the MPT tree, which are respectively leaf nodes, extension nodes and branch nodes.

A leaf node is a key-value pair expressed as [key, value], where the key is a special hexadecimal coded character, and the value is the state data of the account address corresponding to the leaf node (that is, the structure shown above). An extension node is also a key-value pair expressed as [key, value], where the key is also a special hexadecimal coded character, but the value is a hash value (hash pointer) of other nodes, which means that other node can be linked through the hash pointer link.

A branch node contains 17 elements. The first 16 elements correspond to the 16 possible hexadecimal characters in the key; one text symbol corresponds to a nibble. If a [key, value] pair terminates at this branch node, the branch node can play the role of a leaf node, and the last element represents the value of the leaf node; otherwise, the last element of the branch node can be null.

Since in an MPT tree, characters on a search path from the root node to a leaf node constitute a complete account address; therefore, for a branch node, it can be either the terminal node of the search path or an intermediate node of the search path.

Assuming that the account state data that needs to be organized into an MTP state tree is shown in Table 1 below:

TABLE 1

| Account Address (Key) | | | | | | | Account State (Value) |
|---|---|---|---|---|---|---|---|
| a | 7 | 1 | 1 | 3 | 5 | 5 | state 1 |
| a | 7 | 7 | d | 3 | 3 | 7 | state 2 |
| a | 7 | f | 9 | 3 | 6 | 5 | state 3 |
| a | 7 | 7 | d | 3 | 9 | 7 | state 4 |

In Table 1, the account address is a string of hexadecimal characters. The account state state is a structure composed of the fields such as Balance, Nonce, Code, and Storage.

Finally, the MPT state tree organized based on the account state data in Table 1 is shown in FIG. 1. The MPT state tree is composed of 4 leaf nodes, 2 branch nodes, and 2 extension nodes.

In FIG. 1, the prefix field is a prefix field shared by the extension node and the leaf node. Different field values of the prefix field can be used to represent different node types.

For example, the value of the prefix field being 0 indicates an extension node containing an even number of nibbles. As mentioned earlier, a nibble represents half of a byte, consisting of 4-bit binary, and a nibble can correspond to a character that constitutes an account address. The value of the prefix field being 1 indicates an extension node containing an odd number of nibble(s). The value of the prefix field being 2 indicates a leaf node containing an even number of nibbles. The value of the prefix field being 3 indicates a leaf node containing an odd number of nibble(s).

For a branch node, since it is a prefix node of single nibbles in parallel, the branch node does not have the prefix field described above.

A Shared nibble field in an extension node corresponds to the key value of the key-value pair contained in the extension node, which represents a common character prefix between account addresses. For example, all account addresses in the table above have a common character prefix a7. The Next Node field is filled with a hash value (a hash pointer) of the next node.

The hexadecimal character 0~f field in the branch node corresponds to the key value of the key-value pair contained in the branch node. If the branch node is an intermediate node on the search path of the account address on the MPT tree, the Value field of the branch node can be null. The 0~f field is used to fill the hash value of the next node.

The key-end in the leaf node corresponds to the key value of the key-value pair contained in the leaf node, and represents the last few characters of the account address. The key value of each node on the search path from the root node to the leaf node constitutes a complete account address. The Value field of the leaf node is filled with account state data corresponding to the account address. For example, the structure formed by the above fields such as Balance, Nonce, Code, and storage can be encoded and then filled into the Value field of the leaf node.

Further, the nodes on the MPT state tree shown in FIG. 1 are finally stored in the database in the form of key-value pairs Key-Value.

Here, when a node on the MPT state tree is stored in the database, the key in the key-value pair of the node on the MPT state tree can be the hash value of the data content contained in the node; and the Value in the key-value pair of the node on the MPT state tree is the data content contained in node.

That is, when a node on the MPT state tree is stored in the database, a hash value of the data content contained in the node can be calculated (that is, a hash value is calculated with respect to the entire node), and the calculated hash value can be used as a key. The data content contained in node is used as value to generate a key-value pair Key-Value; then, the generated key-value pair Key-Value is stored in the database.

Figure 2:
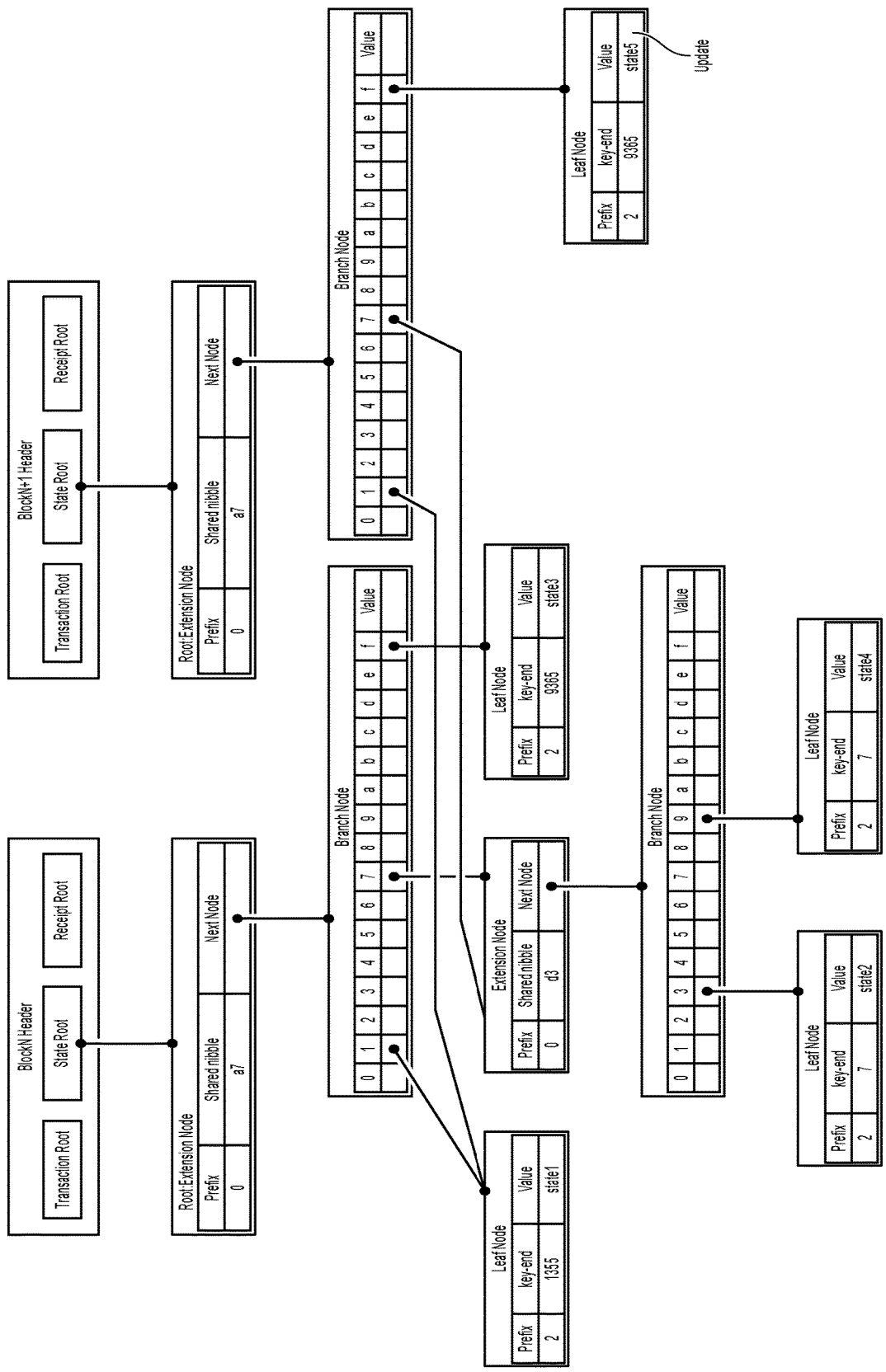
FIG. 2 is a schematic diagram illustrating reusing nodes on an MPT state tree, according to an example of an implementation.

Since the node on the MPT state tree is based on the hash value of the data content contained in the node as the Key, and the data content contained in the node which is stored as the value, when a node on the MPT state tree is searched for, the hash value of the data content contained in the node can generally be used as a key for content addressing. When content addressing is applied, nodes with "duplicate content" can usually be "reused" to save storage space for storing data. As shown in FIG. 2, FIG. 2 is a schematic diagram of reusing nodes on an MPT state tree shown in the present specification.

It should be noted that in actual application, after execution of the transaction in the latest block generated by the blockchain is completed, it can only cause the account state of some accounts to change. Therefore, when building the MPT state tree, it is not necessary to rebuild a complete MPT state tree based on the current state data of all accounts in the blockchain, but only need to update the nodes corresponding to the some accounts of which account states have changed based on the MPT state tree corresponding to the blocks prior to the latest block.

For the nodes on the MPT state tree that correspond to the accounts of which account states have not changed, since no data updates have occurred on these nodes, the nodes on the MPT state tree corresponding to the blocks prior to the latest block can be readily reused.

As shown in FIG. 2, it is assumed that the account state data in Table 1 is the latest account states of all accounts on the blockchain after execution of the transaction in Block N is completed, and the MPT state tree organized based on the account state data in Table 1 is still as shown in FIG. 1.

Assuming that after execution of the transaction in Block N+1 is completed, the account state of the account address "a7f9365" in Table 1 is updated from "state3" to "state5". At this time, when the Block N+1 updates the MPT state tree, it is not necessary to rebuild an MPT state tree based on the current state data of all accounts in the blockchain after execution of the transactions in Block N+1 is completed.

In this case, the value in the leaf node with the key-end being "9365" on the MPT state tree corresponding to Block N (that is, the MPT state tree shown in FIG. 1) can be updated from "state3" to "state5", and continue to update the hash pointers of all nodes on the path from the root node to the leaf node.

That is, when a leaf node on the MPT state tree is updated, as the hash value of the entire leaf node is updated, the hash pointers of all nodes on the path from the root node to the leaf node are also updated accordingly.

For example, still referring to FIG. 2, in addition to updating the value of Value in a leaf node with a "key-end" of "9365", it also needs to update the hash pointer pointing to the leaf node which is filled in the f field of the previous branch node of the leaf node. Further, it is possible to continue to trace back to the root node and continue to update the hash pointer pointing to the branch node which is filled in the "Next Node" field of the previous root node (Root Extension Node) of the branch node.

In addition to the nodes that have been updated above, other nodes that have not been updated can directly reuse the corresponding nodes on the MPT state tree of Block N;

Here, the MPT tree corresponding to Block N needs to be retained as historical data. Therefore, when the MPT state tree is updated by Block N+1, these updated nodes are not modified and updated directly on the original nodes on the MPT state tree corresponding to Block N, but these updated nodes are recreated on the MPT tree corresponding to Block N+1.

That is, on the MPT state tree corresponding to Block N+1, only a small number of nodes that need to be updated are actually recreated. For other nodes that have not been updated, the corresponding nodes on the MPT state tree corresponding to Block N can be directly reused.

For example, as shown in FIG. 2, for the MPT state tree corresponding to Block N+1, actually only an expansion node as a root node, a branch node, and a leaf node need to be recreated; for the nodes that have not been updated, to complete the "reusing" of the nodes, add hash pointers pointing to the corresponding nodes on the MPT state tree corresponding to Block N to these recreated nodes on the MPT state tree. The nodes before the update on the MPT state tree corresponding to Block N will be saved as historical account state data. For example, the leaf node with "key-end" of "9365" and Value of "state3" shown in FIG. 2 will be retained as historical data.

As described above, a few nodes on the MPT state tree of Block N+1 are updated, so that most nodes of the previous block Block N can be "reused" is used as an example. In actual application, the MPT state tree of Block N+1 can also be added with a node compared to that of the previous block Block N. In this case, although the newly added node cannot be "reused" directly from the MPT tree of the previous block Block N, it can be "reused" from the MPT state tree of an earlier block.

For example, although the newly added node on the MPT state tree of Block N+1 is not on the MPT state tree of Block N, the node can appear on the MPT state tree of an earlier block; for example, on the MPT state tree of Block N−1. Therefore, the newly added node on the MPT state tree of Block N+1 can directly reuse the corresponding node on the MPT state tree of Block N−1.

However, although many Merkle trees with "content addressing" represented by the MPT tree can save the storage space of the account state data in the blockchain stored in the database by reusing some "content duplicate" data nodes, with the continuous increase of data, a large amount of historical state data can be too redundant, which will inevitably lead to a decline in access performance for the Merkle state tree, and will eventually affect the TPS (Transactions Per Second) indicator of the blockchain platform.

For example, in actual application, since the Merkle tree with "content addressing" represented by the MPT tree can have node reuse, many data nodes on the Merkle state tree of the latest block are reused data nodes on the Merkle state tree corresponding to historical blocks, which will result in the latest account state data of many blockchain accounts maintained on the Merkle state tree of the latest block being actually "mixed" among numerous historical account state data. Therefore, when the latest account state of each blockchain account is searched for, a large amount of historical state data has to be traversed, which affects the access performance of the Merkle state tree.

In view of above, the present specification proposes a technical solution that supports both the current Merkle state tree and the historical Merkle state tree in a blockchain model, to improve the access performance of the Merkle state tree.

In implementation, the account state data in the blockchain can still be organized into a Merkle state tree and stored in the database;

The above Merkle state tree can include a current Merkle state tree and a historical Merkle state tree. The current Merkle state tree is a Merkle state tree formed by the latest account states of each blockchain account. The historical Merkle state tree is a Merkle state tree formed by the historical account states of each blockchain account. Each block has a current Merkle state tree and a historical Merkle state tree corresponding to the block.

Further, after the execution of the transaction in a target block is completed, on the one hand, based on the updated latest account state of a target account related to the transaction in the target block, updated data nodes corresponding to the current Merkle state tree of the target block can be generated; and on the other hand, based on a historical account state of the target account before update, historical data nodes corresponding to the historical Merkle state tree of the target block can be generated.

After the updated data nodes and the historical data nodes are generated, data nodes corresponding to the target account on the current Merkle state tree of the previous block of the target block can be modified and updated based on the generated updated data nodes, to obtain the current Merkle state tree of the target block.

Based on the generated historical data nodes and data nodes other than the reused data nodes corresponding to the target account on the historical Merkle state tree of the previous block of the target block, a historical Merkle state tree for the target block is created.

In the above technical solution, since there is no data-node reusing relationship between the current Merkle state tree and the historical Merkle state tree, the current Merkle state tree only maintains the latest account state of each blockchain account, and the historical Merkle state tree only maintains the historical account state of each blockchain account. When the latest account state of each blockchain account is searched for, it only needs to traverse the current Merkle state tree of the previous block, to find the latest account state after execution of the transaction of the account is completed in the previous block, which can improve the access performance of the Merkle state tree.

Referring to FIG. 3, which is a flowchart illustrating a method of storing blockchain state data according to an example of an implementation. The method is applied to a blockchain node device. The account state data in the blockchain is organized into a Merkle state tree and stored in a database. The Merkle state tree includes a current Merkle state tree formed of the latest account state of each blockchain account, and a historical Merkle state tree formed of a historical account state of each blockchain account. The method includes the following steps.

Step 302: after execution of a transaction in a target block is completed, based on a latest account state of a target account related to the transaction in the target block, updated data nodes corresponding to the current Merkle state tree of the target block and historical data nodes corresponding to the historical Merkle state tree of the target block are generated.

Step 304: based on the generated updated data nodes, data nodes corresponding to the target account on the current Merkle state tree of the previous block of the target block are modified and updated, to obtain the current Merkle state tree of the target block.

Step 306: based on the generated historical data nodes and data nodes other than the reused data nodes corresponding to the target account on the historical Merkle state tree of the previous block of the target block, the historical Merkle state tree for the target block is created. In an illustrated implementation, the Merkle tree can specifically include any form of a Merkle tree variant incorporated with a tree structure of a Trie dictionary tree.

For example, in actual application, the above Merkle tree can still be the MPT tree adopted by the public blockchain represented by Ethereum; or, for the blockchain model derived based on the Ethereum architecture, in addition to the improved Merkle tree such as the MPT tree, the above Merkle tree can be other forms of Merkle tree variants similar to the MPT tree, which incorporate the tree structure of the Trie dictionary tree. The forms of the Merkel tree will not be listed one by one in the present specification.

Account state data in the blockchain can be organized into the data structure of the Merkle state tree and stored in the above database.

For example, the above Merkle state tree can still be an MPT tree, and the data structure of the MPT tree can be used to organize the account state data of the blockchain into an MPT state tree.

Here, in the present specification, the Merkle state tree formed by the account state data in the blockchain can specifically include a current Merkle state tree and a historical Merkle state tree. The current Merkle state tree is a Merkle state tree formed by the latest account state of each blockchain account; and the historical Merkle state tree is a Merkle state tree formed by a historical account state of each blockchain account.

Here, for each block in the blockchain, there is a current Merkle state tree and a historical Merkle state tree corresponding to the block.

It should be noted that the current Merkle state tree and the historical Merkle state tree are two independent Merkle state trees; there is no data-node reusing relationship between the current Merkle state tree and the historical Merkle state tree.

Here, that there is no data-node reusing relationship between the current Merkle state tree and the historical Merkle state tree means that the current Merkle state tree of any block in the blockchain will include data nodes corresponding to all of the accounts in the blockchain without reusing any data node on the historical Merkle state tree of any block or any block prior to the block.

For example, in actual application, when creating a current Merkle state tree for a target block, because the current Merkle state tree of the previous block will contain data nodes corresponding to all of the accounts in the blockchain, some data nodes that have been updated can be modified and updated based on the current Merkle state tree of the previous block directly, to obtain the current Merkle state tree of the target block, without having to reuse any data node on the historical Merkle state tree of the block or of any historical block prior to the block.

For the historical Merkle state tree of any block in the blockchain, it can only contain data nodes corresponding to the account related to the transaction in the block, and for data nodes corresponding to other blockchain accounts than the account related to the transaction in the block, data nodes on the historical Merkle state tree of any historical block prior to the block can be directly reused. The specific data node reusing method can still refer to FIG. 2 and the description related to FIG. 2.

In the present specification, a user client accessing the blockchain can package data into a standard transaction format supported by the blockchain, and then post it to the blockchain; node devices in the blockchain cooperating with other node devices can, based on the installed consensus algorithm, perform consensus on these transactions posted by the user client to the blockchain, to generate the latest blocks for the blockchain. The specific consensus process is not repeated here for simplicity.

After the node device in the blockchain executes the transactions in the target block, the account state of the target account related to these executed transactions in the blockchain usually also changes accordingly. Therefore, after the execution of the transactions of the node device in the target block is completed, the current Merkle state tree and the historical Merkle state tree can be respectively created for the target block based on the historical account state (that is, the account state before the transaction in the target block is executed) of the target account before account update and the latest account state (that is, the account state after the transaction in the target block is executed) after the account update.

It should be noted that the above target block can refer to the latest block generated in the blockchain or any historical block in the blockchain.

That is, in the present specification, whether a node device executes a transaction in a newly generated latest block or re-executes a transaction in any historical block, after the execution of the transaction in that block is completed, a current Merkle state tree and a historical Merkle state tree can be respectively created for the block of the execution, based on the historical account state of the target account related to the executed transaction before account update and the latest account state after the account update.

In the present specification, after the execution of the transaction in the target block is completed, the node device can generate updated data nodes corresponding to the current Merkle state tree of the target block based on the updated latest account state of the target account related to the transaction in the target block.

For example, in implementation, the node device can search for the data nodes corresponding to the target account related to the transaction in the target block on the current Merkle state tree of the previous block, and copy these data nodes that have been found; then based on the updated latest account state of the target account, the values of the copied data nodes are modified and updated to obtain the updated data nodes. The process of searching and updating the values of the data nodes can still refer to FIG. 1 and the description related to FIG. 1.

Correspondingly, after the execution of the transaction in the target block is completed, the node device can also generate historical data nodes corresponding to the historical Merkle state tree of the target block based on the historical account state of the target account related to the transaction in the target block before update.

For example, in implementation, the node device can also search for the data nodes corresponding to the target account related to the transactions in the target block on the historical Merkle state tree of the previous block, and copy these data nodes that have been found; then based on the historical account state of the target account before the update, the values of the copied data nodes are modified and updated to obtain the historical data nodes.

In an illustrated implementation, both the updated data node and historical data node can be represented in the form of a write set.

During the execution of transaction in the target block, the node device in the blockchain can first generate a read-write set corresponding to the transaction in the target block. The generated read-write set can also be stored in the database; for example, in actual application, the generated read-write set can be saved as a transaction execution log in a receipt corresponding to the transaction.

The read-write set is specifically used to record the account state of the account related to the transaction before the transaction in the target block is executed (that is, the historical account state before the account is updated); and the account state of the account related to the transaction after execution of the transaction in the target block is completed (that is, the latest account state after the account is updated).

For example, taking the transaction in the target block as a transfer transaction as an example, the read-write set corresponding to the transaction in the target block can be represented as <account, Balance1, Balance2>; where account indicates a transfer account related to the transaction in the target block, Balance1 indicates a fund balance of the transfer account before the transfer transaction is executed, and Balance2 indicates a fund balance of the transfer account after the transfer transaction is executed.

After the execution of the transaction in the target block is completed, the node device can further generate a write set corresponding to the Merkle state tree of the target block based on the read-write set corresponding to the transaction in the target block; the write set is configured to describe the data nodes of the Merkle state tree that need to be written to the target block.

Here, it should be noted that in the present specification, for any block in the blockchain, there are two Merkle state trees: the current Merkle state tree and the historical Merkle state tree. Therefore, after the execution of the transaction in the target block is completed, the node device can further generate two modification sets based on the read-write set corresponding to the transaction in the target block; one of the write sets is a write set corresponding to the current Merkle state tree of the target block, which includes data nodes that need to be written to the current Merkle state tree of the target block (that is, the updated data nodes); and the other write set is a write set corresponding to the historical Merkle state tree of the target block, which includes data nodes that need to be written to the historical Merkle state tree of the target block (that is, the historical data nodes).

In the present specification, when the node device generates updated data nodes corresponding to the current Merkle state tree of the target block based on the updated latest account state of the target account related to the transaction in the target block; and, generates historical data nodes corresponding to the historical Merkle state tree of the target block based on the historical account state of the target account related to the transaction in the target block before the update, the node device can create the current Merkle state tree and the historical Merkle state tree for the target block, respectively based on the generated updated data nodes and historical data nodes.

On the one hand, the node device can modify and update some data nodes that have been updated based on the current Merkle state tree of the previous block, to create the current Merkle state tree for the target block.

In this case, the generated updated data nodes are data nodes that need to be modified and updated on the current Merkle state tree of the previous block. The node device can search for the data nodes corresponding to the target account on the current Merkle state tree of the previous block of the target block, and modify and update the found data nodes based on the generated updated data nodes. When the modification and update are completed, the current Merkle state tree of the target block can be obtained.

For example, in implementation, if the updated data nodes are represented as a write set, the data nodes corresponding to the target account on the current Merkle state tree of the previous block of the target block can be modified and updated based on the write set.

On the other hand, the node device can also recreate and add some data nodes that have been updated based on the historical Merkle state tree of the previous block, and reuse data nodes other than the data nodes corresponding to the target account on the historical Merkle state tree of the previous block, to create a historical Merkle state tree for the target block.

In this case, the generated historical data nodes are data nodes that need to be recreated and added. The node device can search for other data nodes other than the data nodes corresponding to the target account on the historical Merkle state tree of the previous block of the target block, and reuse such other data nodes that have been found; then, based on the generated historical data nodes and the reused other data nodes, create a historical Merkle state tree for the target block. For the reusing process of the data nodes, reference can be made to FIG. 2 and the description related to FIG. 2.

For example, in implementation, if the historical data nodes are also represented in the form of a write set, based on the write set, and the reused data nodes other than the data nodes corresponding to the target account on the historical Merkle state tree of the previous block of the target block, a historical Merkle state tree for the target block is created.

From the above description, it can be known that for the historical Merkle state tree, more operations involving writing new historical data nodes to the historical Merkle state tree, not operation of modifying and updating data nodes. Therefore, the historical Merkle state tree does not require higher performance for reading data.

For the current Merkle state tree, more operations are involved in modifying and updating data nodes. Moreover, in actual application, when executing transaction, node devices often need to frequently invoke the latest account state of each blockchain account maintained in the current Merkle state trees. Therefore, the current Merkle state tree requires higher performance for reading data and modifying data.

In view of the above, in actual application, when the historical Merkle state tree is stored in the database, a data structure with higher writing performance and less reading performance can be adopted; and when the current Merkle state tree is stored in the database, a data structure with higher reading and modifying performance and less modifying performance can be adopted.

In an illustrated implementation, the data nodes on the current Merkle state tree can be organized into a data structure of a B+ tree (balance+tree) and stored in a database; and the data nodes on the historical Merkle state tree can be organized into a data structure of an LSM tree (Log-Structured Merge Tree) and stored in the database. The specific methods of organizing the data nodes on the current Merkle state tree into a B+ tree (balance+tree) and the data structures on the historical Merkle state tree into an LSM tree are not described in detail in the present specification.

In an illustrated implementation, the above database can be a Key-Value database; for example, in an illustrated implementation, the above database can be a LevelDB database with a multi-layer storage structure; or, a database based on LevelDB architecture; for example, Rocksdb database is a typical database based on LevelDB database architecture.

In this case, whether it is the current Merkle state tree or the historical Merkle state tree, it will eventually be stored in the form of a key-value pair Key-Value to the above database.

As mentioned earlier, since the historical Merkle state tree still has the situation of reusing data nodes on the historical Merkle state tree of the previous block, the current Merkle state tree does not need to consider the situation of data node reusing, but gets more involved in modifying the value of the data nodes; based on this difference in characteristics, when the data nodes on the current Merkle state tree and the historical Merkle state tree are stored to the above database in the form of key-value pairs Key-Value, the current Merkle state tree and historical Merkle state tree can be designed with different keys.

In an illustrated implementation, in view of the fact that the historical Merkle state tree will still reuse data nodes on the historical Merkle state tree of the previous block, when a data node on the historical Merkle state tree is stored to the above database in the form of a key-value pair Key-Value, the hash value of the data content contained in the data node can still be used as the key.

In view of the current Merkle state tree requires for frequent modification of the values of the data nodes, when a data node on the current Merkle state tree is stored in the database as a key-value pair Key-Value, the node ID of the data node can be used as the key.

In actual application, the node ID can be a character prefix corresponding to a path from the root node to the data node of the Merkle state tree; or a node number obtained by mapping the character prefix corresponding to the path from the root node to the data node of the Merkle state tree.

In the above technical solution, on the one hand, since there is no data-node reusing relationship between the current Merkle state tree and the historical Merkle state tree, the current Merkle state tree only maintains the latest account state of each blockchain account, and the historical Merkle state tree only maintains the historical account state of each blockchain account, when the latest account state of each blockchain account is searched for, it only needs to traverse the current Merkle state tree of the previous block to find the latest account state after execution of the transaction of the account is completed in the previous block, which can improve the access performance of the Merkle state tree.

On the other hand, since the amount of data in the historical Merkle state tree is easily to increase rapidly, data migration and hierarchical storage are often required, the Merkle state tree formed by the account state data in the blockchain is designed into a double tree structure of a current Merkle state tree and a historical Merkle state tree, which is more conducive to data migration and hierarchical storage. For example, in actual application, the above database can be a multi-level data storage structure. When the capacity of any level of data storage is insufficient, the historical Merkle state tree stored in the data storage can be migrated to the next-level data storage, and only the current Merkle state tree is retained in the data storage at this level.

Corresponding to the above method implementations, this application also provides implementations of an apparatus.

Corresponding to the above method implementations, the present specification also provides an implementation of an apparatus for storing blockchain state data.

The implementations of the apparatus for storing blockchain state data of the present specification can be applied to an electronic device. The apparatus implementation can be implemented by software, or by hardware or a combination of software and hardware. Taking software implementation as an example, as an apparatus in a logical sense, it is formed by reading the corresponding computer program instructions in the non-volatile memory into the memory through the processor of the electronic device where it is located.

Figure 4:
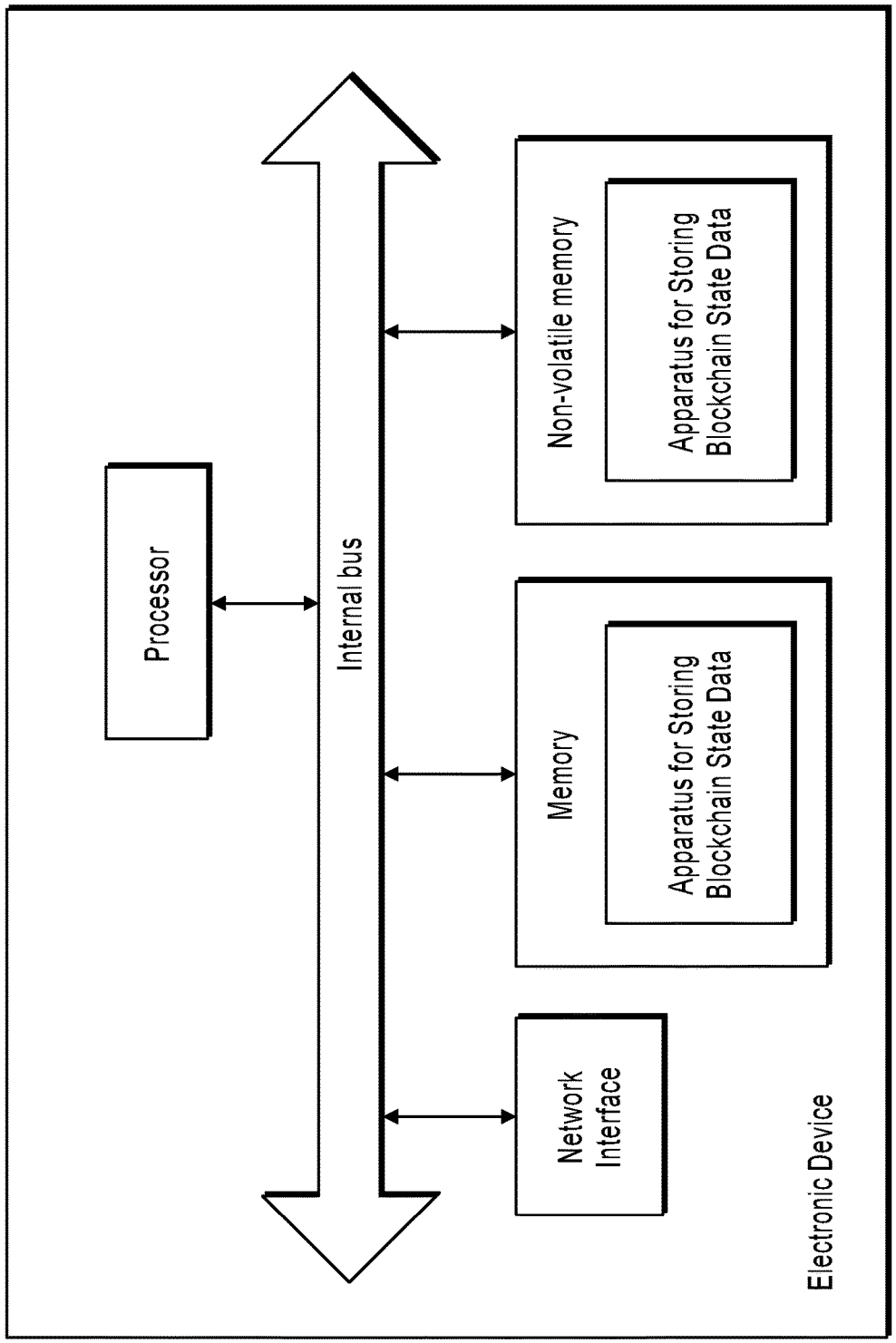
FIG. 4 is a schematic structural diagram illustrating an electronic device, according to an example of an implementation.

In terms of hardware, as shown in FIG. 4, which is a hardware structure diagram of the electronic device where the apparatus for storing blockchain state data of the present specification is located, in addition to the processor, the memory, the network interface, and the non-volatile memory, the electronic device in which the apparatus is located in the implementation can generally include other hardware based on the actual function of the electronic device, and details are omitted here for simplicity.

Figure 5:
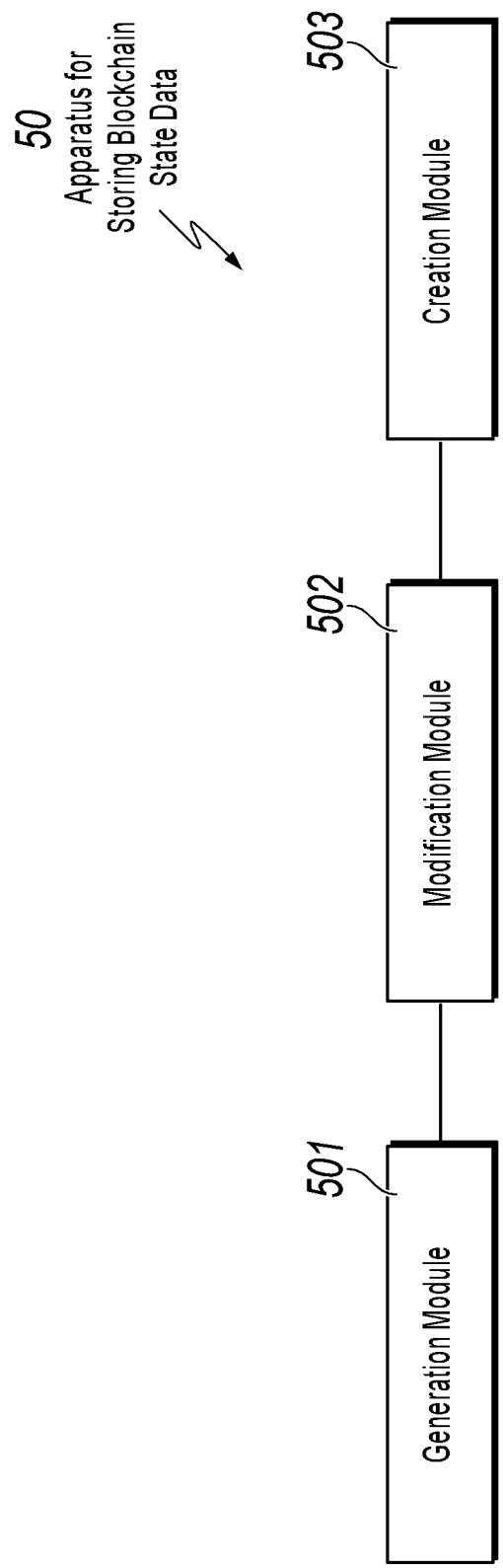
FIG. 5 is a block diagram illustrating an apparatus for storing blockchain state data, according to an example of an implementation.

FIG. 5 is a block diagram of an apparatus for storing blockchain state data according to an example of an implementation of the present specification.

Referring to FIG. 5, the apparatus 50 for storing blockchain state data can be applied to the electronic device shown in previously described FIG. 4, wherein the account state data in the blockchain is organized into a Merkle state tree and stored in a database; the Merkle state tree includes a current Merkle state tree formed by a latest account state of each blockchain account; and a historical Merkle state tree formed by a historical account state of each blockchain account; the apparatus 50 includes: a generation module 501 configured to, after execution of a transaction in a target block is completed, based on a latest account state of a target account related to the transaction in the target block after the update, generate updated data nodes corresponding to the current Merkle state tree of the target block and; based on a historical account state of the target account before the update, generate historical data nodes corresponding to the historical Merkle state tree of the target block; a modification module 502 configured to, based on the generated updated data nodes, modify and updated data nodes corresponding to the target account on the current Merkle state tree of the previous block of the target block, to obtain the current Merkle state tree of the target block; and a creation module 503 configured to, based on the generated historical data nodes and data nodes other than the reused data nodes corresponding to the target account on the historical Merkle state tree of the previous block of the target block, create the historical Merkle state tree for the target block.

In this implementation, the data nodes on the current Merkle state tree are organized into a data structure of a B+ tree, and stored in the database; and the data nodes on the historical Merkle state tree are organized into a data structure of an LSM tree, and stored in the database.

In this implementation, the database is a Key-Value database.

The data nodes on the Merkle state tree are stored in the database in the form of Key-Value pairs; wherein a key of a data node on the current Merkle state tree is a node ID of the data node; a key of a data node on the historical Merkle state tree is a hash value of data content contained in the data node.

In this implementation, the database is a LevelDB database; or a database based on a LevelDB architecture.

In this implementation, the database is a Rocksdb database based on the LevelDB architecture.

In this implementation, the Merkle tree is a variant of the Merkle tree with a tree structure incorporating a Trie dictionary tree.

In this implementation, the Merkle state tree is a Merkle Patricia Tree state tree.

The system, apparatus, module, or unit described in the previous implementations can be implemented by a computer chip or entity, or can be implemented by using a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

In a typical configuration, a computer includes one or more of a processor (CPU), an input/output interface, a network interface, and a memory.

The memory can include a transitory memory, a random access memory (RAM), and/or a non-volatile memory in a computer-readable medium, such as a read-only memory (ROM) or a flash RAM. The memory is an example of a computer-readable medium.

The computer-readable medium includes persistent, non-persistent, removable or non-removable medium, which can store information by any method or technology. Information can be computer-readable instructions, data structures, modules of a program, or other data. Examples of computer storage media include, but are not limited to, a parameter random access memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a compact disc read-only memory (CD-ROM), a digital versatile disc (DVD) or other optical storage, a cassette magnetic tape, magnetic disk storage, a quantum memory, graphene-based storage media, or other magnetic storage devices or any other non-transmission media can be used to store information that can be accessed by computing devices. Based on the definition in the present specification, computer-readable media does not include transitory computer-readable media (transitory media), such as modulated data signals and carrier waves.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

The specific implementations of the present specification have been described above. Other implementations are within the scope of the following claims. In some cases, the actions or steps recited in the claims can be performed in a different order than in the implementations and the desired result can still be achieved. In addition, the processes depicted in the figures do not necessarily require the particular order shown or sequential order to achieve the desired results. In some implementations, multitasking and parallel processing are also possible or can be advantageous.

The terms used in the present specification are for the purpose of describing particular examples only, and are not intended to limit the present specification. Terms determined by "a", "the" and "said" in their singular forms in the present specification and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present specification to describe various information, such information should not be limited to these terms. These terms are only used to distinguish one category of information from another. For example, without departing from the scope of the present specification, first information can be referred as second information; and similarly, second information can also be referred as first information. Depending on the context, the word "if" as used herein can be interpreted as "when" or "upon" or "in response to determining".

The previous descriptions are merely preferred implementations of one or more implementations of the present specification, and are not intended to limit the present specification. Any modifications, equivalent replacements, and improvements made within the spirit and the principle of the present specification shall fall within the scope of the claims in the present specification.

What is claimed is:

1. A computer-implemented method of storing blockchain state data, comprising:
   after execution of a transaction in a target block in a blockchain is completed, based on a latest account state of a target account related to the transaction after execution of the transaction, modifying and updating, by a blockchain node device, data nodes corresponding to the target account on a current Merkle state tree of a previous block adjacent to the target block, to obtain a current Merkle state tree of the target block,
   wherein the current Merkle state tree of the target block is formed by latest account states of blockchain accounts of the blockchain;
   based on a historical account state of the target account before execution of the transaction, generating, by the blockchain node device, historical data nodes corresponding to a historical Merkle state tree of the target block, wherein the historical Merkle state tree of the target block is formed by historical account states of blockchain accounts of the blockchain; and
   based on (i) the generated historical data nodes and (ii) data nodes other than data nodes corresponding to the target account on a historical Merkle state tree of the previous block adjacent to the target block, creating, by the blockchain node device, the historical Merkle state tree of the target block,
   wherein the current Merkle state tree of the target block and the historical Merkle state tree of the target block are distinct Merkle state trees and are stored in a database, wherein at least some data stored in the historical Merkle state tree of the target block is blockchain account data not stored in the current Merkle state tree of the target block, wherein the current Merkle state tree of the previous block adjacent to the target block and the historical Merkle state tree of the previous block adjacent to the target block are distinct Merkle state trees and are stored in the database, and wherein at least some data stored in the historical Merkle state tree of the previous block adjacent to the target block is blockchain account data not stored in the current Merkle state tree of the previous block to the target block.

2. The computer-implemented method of claim 1, wherein data nodes on the current Merkle state tree of the target block are organized into a data structure of a B+ tree and stored in the database; and
   wherein data nodes on the historical Merkle state tree of the target block are organized into a data structure of a Log-Structured Merge tree and stored in the database.

3. The computer-implemented method of claim 1, wherein the database is a Key-Value database;
   wherein data nodes on the current Merkle state tree of the target block and data nodes on the historical Merkle state tree of the target block are stored in the database in the form of Key-Value pairs;
   wherein a key of each data node on the current Merkle state tree of the target block is a node ID of the data node; and
   wherein a key of each data node on the historical Merkle state tree of the target block is a hash value of data content contained in the data node.

4. The computer-implemented method of claim 1, wherein the database is a LevelDB database or a database based on a LevelDB architecture.

5. The computer-implemented method of claim 4, wherein the database is a Rocksdb database based on the LevelDB architecture.

6. The computer-implemented method of claim 1, wherein the current Merkle state tree of the target block and the historical Merkle state tree of the target block each have a structure of a Merkle state tree variant having a tree structure incorporating a Trie dictionary tree.

7. The computer-implemented method of claim 1, wherein the current Merkle state tree of the target block and the historical Merkle state tree of the target block are each a Merkle Patricia Tree state tree.

8. The computer-implemented method of claim 1, wherein data of data nodes on the current Merkle state tree of the target block is stored separately from data of data nodes on the historical Merkle state tree of the target block.

9. The computer-implemented method of claim 1, wherein data of data nodes on the current Merkle state tree of the target block is stored separately from data of data nodes on the historical Merkle state tree of the previous block adjacent to the target block.

10. A non-transitory, computer-readable medium storing one or more instructions that, when executed by a computer system of a blockchain node device, cause the blockchain node device to perform operations for storing blockchain data, the operations comprising:
    after execution of a transaction in a target block in a blockchain is completed, based on a latest account state of a target account related to the transaction after execution of the transaction, modifying and updating data nodes corresponding to the target account on a current Merkle state tree of a previous block adjacent to the target block, to obtain a current Merkle state tree of the target block,
    wherein the current Merkle state tree of the target block is formed by latest account states of blockchain accounts of the blockchain;
    based on a historical account state of the target account before execution of the transaction, generating historical data nodes corresponding to a historical Merkle state tree of the target block, wherein the historical Merkle state tree of the target block is formed by historical account states of blockchain accounts of the blockchain; and
    based on (i) the generated historical data nodes and (ii) data nodes other than data nodes corresponding to the target account on a historical Merkle state tree of the previous block adjacent to the target block, creating the historical Merkle state tree of the target block,
    wherein the current Merkle state tree of the target block and the historical Merkle state tree of the target block are distinct Merkle state trees and are stored in a database, wherein at least some data stored in the historical Merkle state tree of the target block is blockchain account data not stored in the current Merkle state tree of the target block, wherein the current Merkle state tree of the previous block adjacent to the target block and the historical Merkle state tree of the previous block adjacent to the target block are distinct Merkle state trees and are stored in the database, and wherein at least some data stored in the historical Merkle state tree of the previous block adjacent to the target block is blockchain account data not stored in the current Merkle state tree of the previous block to the target block.

11. The non-transitory, computer-readable medium of claim 10, wherein data nodes on the current Merkle state tree of the target block are organized into a data structure of a B+ tree and stored in the database; and
wherein data nodes on the historical Merkle state tree of the target block are organized into a data structure of a Log-Structured Merge tree and stored in the database.

12. The non-transitory, computer-readable medium of claim 10, wherein the database is a Key-Value database;
wherein data nodes on the current Merkle state tree of the target block and data nodes on the historical Merkle state tree of the target block are stored in the database in the form of Key-Value pairs;
wherein a key of each data node on the current Merkle state tree of the target block is a node ID of the data node; and
wherein a key of each data node on the historical Merkle state tree of the target block is a hash value of data content contained in the data node.

13. The non-transitory, computer-readable medium of claim 10, wherein the database is a LevelDB database or a database based on a LevelDB architecture.

14. The non-transitory, computer-readable medium of claim 13, wherein the database is a Rocksdb database based on the LevelDB architecture.

15. The non-transitory, computer-readable medium of claim 10 wherein the current Merkle state tree of the target block and the historical Merkle state tree of the target block each have a structure of a Merkle state tree variant having a tree structure incorporating a Trie dictionary tree.

16. The non-transitory, computer-readable medium of claim 10, wherein the current Merkle state tree of the target block and the historical Merkle state tree of the target block are each a Merkle Patricia Tree state tree.

17. A computer-implemented system, comprising:
one or more computers of a blockchain node device; and
one or more computer memory devices interoperably coupled with the one or more computers and having tangible, non-transitory, machine-readable media storing one or more instructions that, when executed by the one or more computers, cause the one or more computers to perform one or more operations for storing blockchain data, the operations comprising:
after execution of a transaction in a target block in a blockchain is completed, based on a latest account state of a target account related to the transaction after execution of the transaction, modifying and updating data nodes corresponding to the target account on a current Merkle state tree of a previous block adjacent to the target block, to obtain a current Merkle state tree of the target block,
wherein the current Merkle state tree of the target block is formed by latest account states of blockchain accounts of the blockchain;
based on a historical account state of the target account before execution of the transaction, generating historical data nodes corresponding to a historical Merkle state tree of the target block, wherein the historical Merkle state tree of the target block is formed by historical account states of blockchain accounts of the blockchain; and
based on (i) the generated historical data nodes and (ii) data nodes other than data nodes corresponding to the target account on a historical Merkle state tree of the previous block adjacent to the target block, creating the historical Merkle state tree of the target block,
wherein the current Merkle state tree of the target block and the historical Merkle state tree of the target block are distinct Merkle state trees and are stored in a database, wherein at least some data stored in the historical Merkle state tree of the target block is blockchain account data not stored in the current Merkle state tree of the target block, wherein the current Merkle state tree of the previous block adjacent to the target block and the historical Merkle state tree of the previous block adjacent to the target block are distinct Merkle state trees and are stored in the database, and wherein at least some data stored in the historical Merkle state tree of the previous block adjacent to the target block is blockchain account data not stored in the current Merkle state tree of the previous block to the target block.

18. The computer-implemented system of claim 17, wherein data nodes on the current Merkle state tree of the target block are organized into a data structure of a B+ tree and stored in the database; and
wherein data nodes on the historical Merkle state tree of the target block are organized into a data structure of a Log-Structured Merge tree and stored in the database.

19. The computer-implemented system of claim 17, wherein the database is a Key-Value database;
wherein data nodes on the current Merkle state tree of the target block and data nodes on the historical Merkle state tree of the target block are stored in the database in the form of Key-Value pairs;
wherein a key of each data node on the current Merkle state tree of the target block is a node ID of the data node; and
wherein a key of each data node on the historical Merkle state tree of the target block is a hash value of data content contained in the data node.

20. The computer-implemented system of claim 17, wherein the database is a LevelDB database or a database based on a LevelDB architecture.

21. The computer-implemented system of claim 20, wherein the database is a Rocksdb database based on the LevelDB architecture.

22. The computer-implemented system of claim 17, wherein the current Merkle state tree of the target block and the historical Merkle state tree of the target block each have a structure of a Merkle state tree variant having a tree structure incorporating a Trie dictionary tree.

* * * * *